Dec. 28, 1937. H. G. KLEMM ET AL 2,103,466
AIRCRAFT CONSTRUCTION
Filed Dec. 29, 1936 2 Sheets-Sheet 2
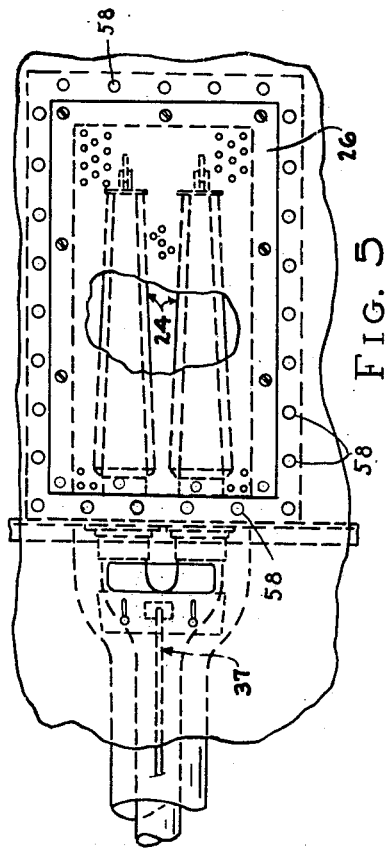
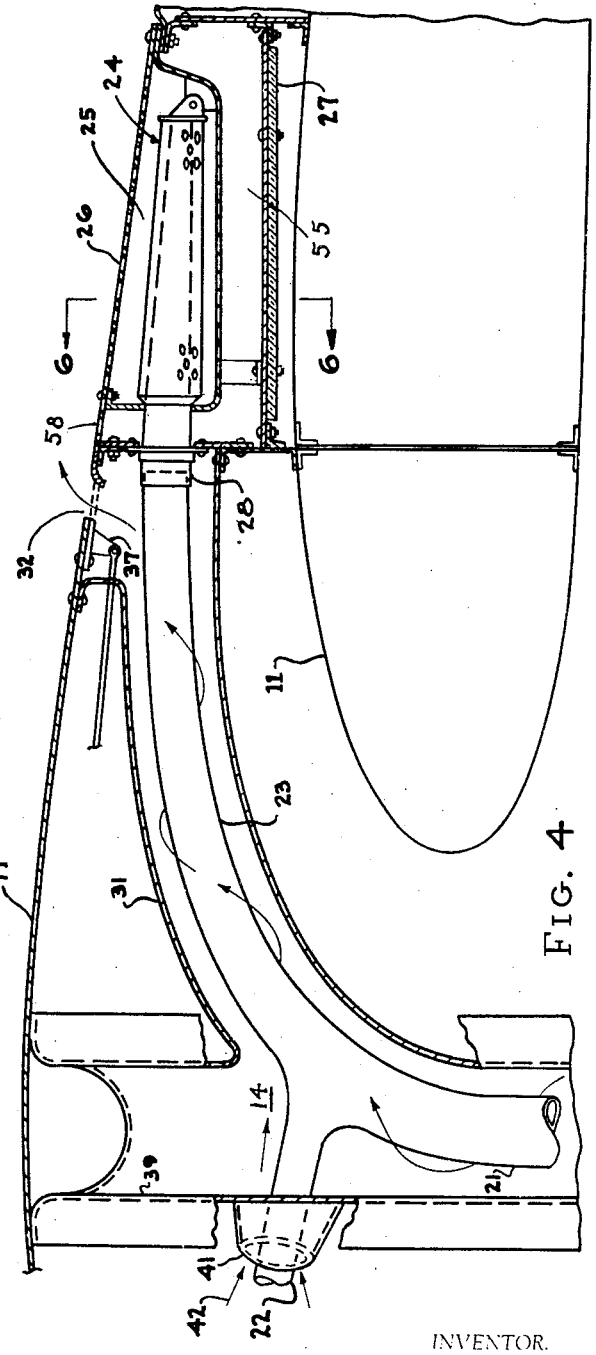
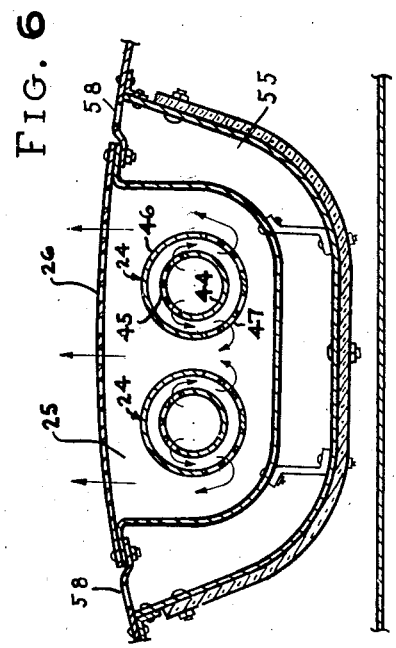
INVENTOR.
HERMAN G. KLEMM
BERTHOUD C. BOULTON
BY
ATTORNEY.

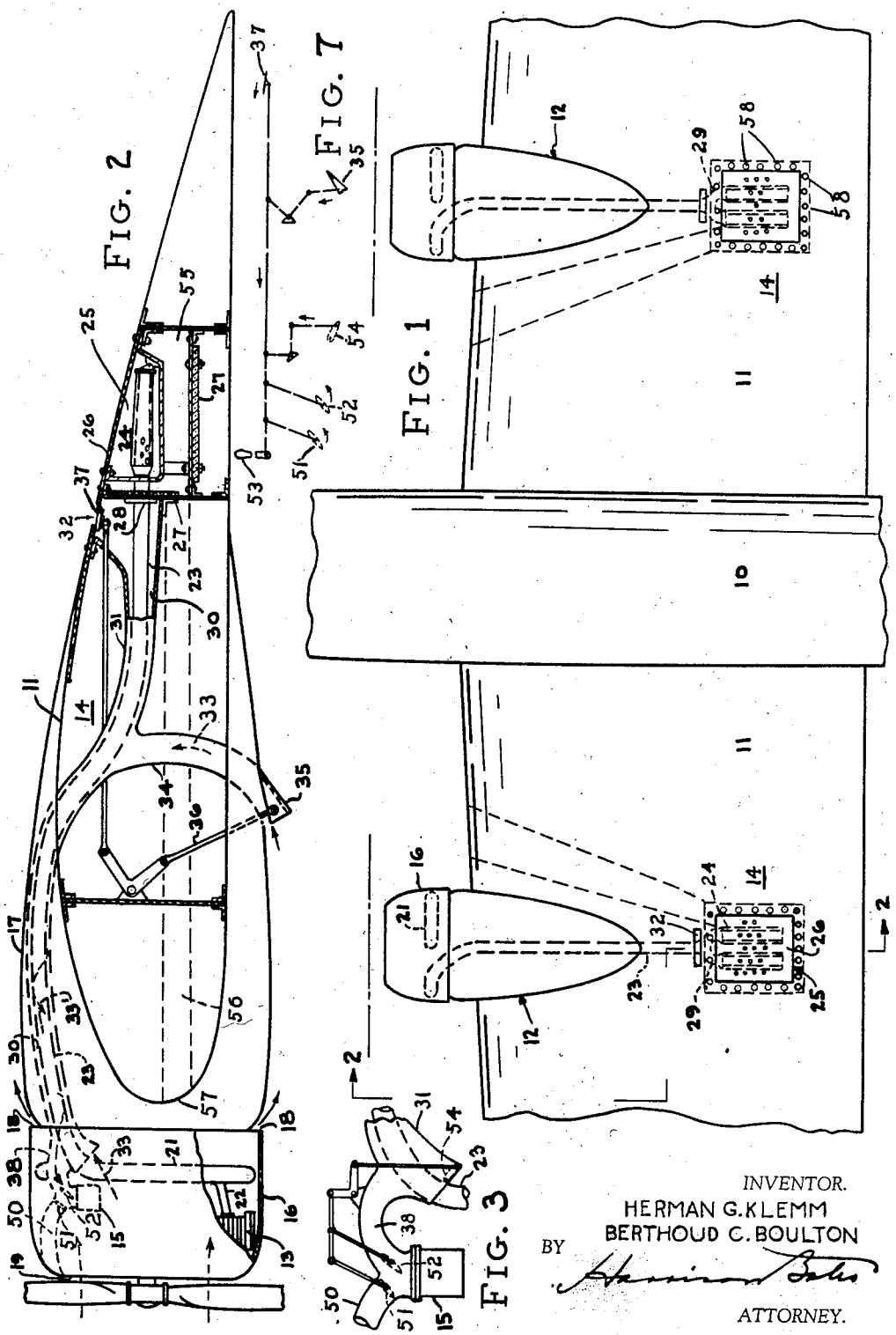
Dec. 28, 1937. H. G. KLEMM ET AL 2,103,466
AIRCRAFT CONSTRUCTION
Filed Dec. 29, 1936 2 Sheets-Sheet 1
INVENTOR.
HERMAN G. KLEMM
BERTHOUD C. BOULTON
BY
ATTORNEY.

Patented Dec. 28, 1937

2,103,466

UNITED STATES PATENT OFFICE 2,103,466

AIRCRAFT CONSTRUCTION

Herman G. Klemm, Baltimore, and Berthoud C. Boulton, Towson, Md., assignors to The Glenn L. Martin Company, Baltimore, Md.

Application December 29, 1936, Serial No. 118,072

7 Claims. (Cl. 244—53)

This invention relates to an aircraft construction and more particularly to an improved method and apparatus for dissipating the exhaust gases from an aircraft engine.

It has heretofore been the general practice to extend the exhaust outlet externally of the aircraft surfaces where the exhaust gases expand for the greater part within the airstream surrounding the surfaces of the aircraft. These protrusions are not only undesirable because of the turbulence produced by their interference with the air-stream, but the expansion of the exhaust gases as well as the velocity and temperature thereof also act to set up additional air disturbances which impair the efficiency of the aerodynamic feature of the aircraft surfaces adjacent to the exhaust outlet or outlets.

It is one object of this invention to provide an improved method and apparatus for overcoming the above difficulties.

Another object is to provide an improved method and apparatus that shall operate to dissipate the exhaust gases of an aircraft engine externally of the aircraft surfaces in such a manner as will obviate objectionable disturbances to the airstream.

Another object is to provide an improved method and apparatus that shall initially accommodate the exhaust gases flowing from an exhaust silencer of an aircraft engine within the surfaces of the aircraft.

Another object is to provide an improved method and apparatus having the above characteristics that shall include a novel means for expanding the exhaust gases as well as reducing the velocity and temperature thereof within the confines of the aircraft surfaces and subsequently releasing such gases to the surrounding medium of the aircraft.

A further object is to provide a method and apparatus having the above characteristics that shall expand the exhaust gases as well as reduce the velocity and temperature thereof in definite steps and release such gases to the surrounding medium at fairing regions of the aircraft surfaces and at points of negative aerodynamic pressures.

A still further object is to prepare a method and apparatus having the above characteristics that shall include novel means for supplying air to the intake of an engine carburetor at predetermined temperatures.

The above and other objects will be made apparent throughout further description of the invention when taken in connection with the accompanying drawings wherein like reference characters refer to like parts. It is to be distinctly understood that the drawings are not a definition of the invention, but illustrate certain forms by means of which the invention may be effectuated. The invention will be defined by the scope of the appended claims.

In the drawings:

Figure 1 is a fragmentary plan view of an aircraft of the bi-motored monoplane type illustrating one embodiment of the invention.

Figure 2 is a sectional view taken along the line 2—2 of Figure 1.

Figure 3 is an enlarged detail view embodying the invention.

Figure 4 is an enlarged detail sectional view similar to Figure 2 illustrating another embodiment of the invention.

Figure 5 is a fragmentary top plan view of Figure 4.

Figure 6 is an enlarged sectional view taken along the line 6—6 of Figure 4, and Figure 7 is a diagrammatic view of a control arrangement embodying the invention.

The present invention is illustrated and described in connection with an aircraft of the bi-motored monoplane type. However, it is to be understood that the invention is equally adaptable for use with other types of aircraft.

Referring to the drawings, Figures 1, 2, and 3 illustrate one embodiment of the invention wherein 10 indicates an aircraft fuselage mounted on or having laterally extending from the sides thereof a wing 11 and a power plant represented in its entirety by 12 positioned on each side of the fuselage 10 and supported by the structure of the wing 11. The power plant which includes the engine 13 is provided with exhaust means represented in its entirety by 14, and a carburetor intake 15. In the form shown, the engine 13 is of the radial type and mounted within a ring cowling 16, the rear edge of which is adapted to cooperate with the forward portion of a nacelle body 17 and defining an annular opening 18 therebetween. The ring cowling 16 is provided with the usual opening 19 in the front thereof for supplying cooling air to the cooling system of the power plant.

The exhaust means 14 here employed comprises an exhaust ring 21, the latter being operably connected with the exhaust of each of the radially disposed engine cylinders by means of pipes 22. Extending rearwardly of the exhaust ring is an exhaust pipe 23 which may be a continuation of the exhaust ring 21 and is employed for connecting the exhaust ring 21 with an exhaust silencer represented in its entirety by 24. The exhaust silencer 24 is located within a compartment 25 provided in the fairing region of the wing 11.

This compartment 25 which includes a perforated or slotted top 26 is preferably constructed so that the entire compartment may be bodily removed from the aircraft. This is important in that the compartment is adapted for readily cleaning, inspecting, repairing and replacing.

The entrance of the pipe 23 is preferably provided with suitable means such as shown at 28 for sealing the interior of the compartment 25 against any egress of gases into that portion of the wing body forward of the compartment 25.

Novel means is provided for cooling the compartment 25 which consists of the provision of a compartment 55 surrounding the compartment 25. This compartment 55 is supplied with cooling air by way of an air duct 56 connecting an opening 57 disposed in the forward portion of the wing 11. The air passing through the air duct 56 and into the compartment 55 is expelled in the fairing region of the wing 11 through openings 58. This compartment 55 serves to cool the compartment 25 as well as to provide an air insulating means between the compartment 25 and the adjacent surfaces of the aircraft. The compartment 55 may be further provided with an asbestos insulation as shown at 27. The air duct may be provided with suitable valve control means, not shown, for regulating the amount of air entering the opening 57 in the forward portion of the wing 11 for controlling the cooling of the compartment 25 as well as maintaining the drag through the air duct 56 and compartment 55 at a minimum.

Any number of mufflers or silencers 24 may be employed in connection with the exhaust pipe 23 as shown at 29 (see Figure 1). Any suitable type of silencer 24 may be employed. However, it is desired that the velocity of the gases be reduced as well as expanded and cooled prior to releasing them to the atmosphere. A novel silencer for accomplishing this purpose will later be described in connection with Figures 4 to 6 inclusive.

This particular construction provides a novel manner in which to supply heated air to the intake of the carburetor when such heated air is desired. This is accomplished by providing a manifold like covering or housing 31 for at least a portion of the length of the exhaust pipe 23 and thereby defining an air passageway 30 connecting the interior of the engine cowling 16 with the air passageway or opening 32 positioned within the fairing region of the wing 11. This particular region being at a point where the aerodynamic pressure is negative effects a suction by way of the opening 32 from the housing 31 and operates to draw air from the cooling system supplied through the opening 19, engine cowling 16, into the forward end of the housing 31 as indicated by the arrow 33, through the housing 31 and operating to absorb heat from the exhaust pipe 23. At some selected point in the housing 31 there is provided an air duct 34 connecting the interior of the housing 31 with an air scoop 35, the latter being provided with suitable controls 36 which may be operated either by the pilot, or by automatic means, for scooping up air and inducing it into the housing 31 and directing it in the direction indicated by the arrow 33'.

In order to effectively accomplish this operation, the opening 32 is provided with suitable means such as shown at 37 (see Figure 2) for closing the opening 32 and eliminating any suction therethrough, also a suitable connection, such as an air duct, 38 is provided for connecting the forward end or the interior of the housing 31 with the intake of the carburetor 15. Any suitable means may be employed for connecting or disconnecting the intake of the carburetor 15 with the air duct 38. Therefore, it follows that when the opening 32 is closed that the scoop 35 will direct air through the air duct 34 forwardly through the housing 31, through the air duct 38, and into the intake 15 of the engine carburetor and that during the passage of air through the exhaust housing 31 it will absorb heat from the exhaust pipe 23 to sufficiently heat the air to a temperature desired at the carburetor.

The carburetor intake 15 is provided with novel means for selectively receiving either air from the housing 31 or from the exterior of the aircraft.

In the form shown, the intake of the carburetor 15 is connected with the exterior of the aircraft by means of an air duct 50 and the interior of the housing 31 by means of an air duct 38. Suitable valves 51 and 52 are located within the air ducts 50 and 38 respectively adjacent the intake of the carburetor 15 for selectively connecting the intake of the carburetor with either a supply of cold air or hot air. When it is desired to supply hot air to the intake of the carburetor 15, it is desirable to close the opening 32 by the means 37 and open the air scoop 35 as well as close the entrance of the cooling air into the forward end of the housing 31. Figure 7 illustrates a control system whereby a single actuating handle 53 may be employed for simultaneously operating the valves 51 and 52, scoop 35, means 37, and a valve 54 positioned within and adapted to close the mouth or forward end of the housing 31. As illustrated in Figures 2 and 7 the several controls are in the position for supplying heated air to the intake of the carburetor 15, the scoop 35 being open while the opening 32 in the fairing region of the wing 11 is closed as well as the forward end of the housing 31 by the valve 54. This permits air to pass by way of the scoop 35, through the air duct 34, through housing 31, air duct 38, and into the intake of the carburetor 15. It will be noted that if the actuating handle 53 is moved to the left as viewed in Figure 7 that the several control connections will be operated to simultaneously close and open the valves 52 and 51 respectively and also simultaneously close the scoop 35 and open the opening 32 and valve 54 within the mouth of the forward end of the housing 31.

Figures 4 and 5 illustrate another embodiment of the invention wherein the compartment 25 is located in the fairing region of nacelle 17. The exhaust pipe 23 in this embodiment, while shorter than that described above, is also supplied with a housing 31 communicating with the interior of an annularly shaped housing 39 disposed about the exhaust ring 21. The fairing of the nacelle 17 is also provided with opening 32 connecting the interior of the housing 31 with the exterior of the nacelle surface. The cooling air for the exhaust pipe 23 is supplied through tube like connections 41 surrounding exhaust pipes 22 and connecting the interior of the housing 39 with the interior of the engine cowling 16. Cooling air enters the tube like members 41 as indicated by the arrows 42 (see Figure 4), passes into the housing 39, and out through the opening 32 by way of the housing 31.

This embodiment includes an improved muffler or silencer for expanding and reducing the velocity and temperature of the exhaust gases. In each of the silencers 24 (see Figure 6) the exhaust gases initially enter an inner cylinder 44, the latter having perforations on its upper surface as shown at 45 for permitting the gases to pass into a second cylinder 46, this cylinder having perforations on its lower surface as shown at 47 for permitting the gases to pass into the compartment 25 for further expansion and reduction of velocity and temperature. These gases are subsequently freed to pass out through the perforated or slotted top 26 of the compartment 25. Any number of cylinders may be employed. However, it is desired that the respective openings such as 45 and 47 be positioned on opposite sides of the adjacent cylinders in order that the gases will be directed around the cylinders prior to entering the surrounding cylinders or compartment 25.

Accordingly, I have provided in an improved aircraft construction a novel method and apparatus wherein the exhaust silencer is accommodated within the aircraft surface in such a manner as to obviate the undesirable feature of having the exhaust outlets extending externally of the aircraft surface; novel means for expanding the exhaust gases as well as reducing the velocity and temperature thereof which operate to further eliminate air disturbances due to the expansion, velocity, and temperature of such gases; a novel construction, an arrangement of an exhaust compartment positioned within the fairing region of the airfoil sections of an aircraft that will permit the release of these gases at points where the aerodynamic pressure, relative to the aircraft surface, is comparatively small and negative in nature; also the present construction provides an exhaust compartment that may be readily removed from the aircraft for cleaning, inspecting, and repairing. All of the above mentioned features operate to obviate air disturbances usually set up due to the direct releasing of exhaust gases within or adjacent to the air stream associated with the aircraft surfaces.

While I have illustrated and described this invention in connection with a bi-motored monoplane it will now be apparent to those skilled in the art that the present invention is equally adapted for the use with a single motored plane and that the exhaust compartment as well as the particular type of silencer used may be positioned at various locations within the aircraft surfaces and still utilize the teachings of this invention and that other changes, modifications, substitutions, additions, and omissions may be made in the structures here illustrated and described without departing from the spirit and scope of the appended claims.

We claim:

1. In an aircraft having high and low pressure areas enveloping the surfaces thereof and having means producing hot exhaust gases, means to exhaust said gases at a surface portion of said aircraft into a low pressure area, and means to produce a flow of cooler gases from within said surfaces into said low pressure area between said means to exhaust said gases and the adjacent portions of said aircraft surfaces.

2. In an aircraft as in claim 1, means to place said cooler gases in heat exchange relation with said exhaust gas within said surfaces of said aircraft.

3. In an exhaust system for aircraft an exhaust chamber located within and communicating with a perforate portion of the surface for said aircraft, a cooling compartment partially enclosing and sealed from said chamber, means to introduce a cooling medium into said compartment, and means exhausting said cooling medium through said surface into a cooling area between said perforate portion and an imperforate portion of said surface.

4. In an exhaust system as in claim 3, said introducing means comprising an air duct extending from said compartment, and said exhausting means comprising another perforate portion of said covering.

5. In an exhaust system as in claim 3, an engine, an exhaust pipe connecting said engine and said chamber, and a cooling jacket surrounding and spaced from said pipe, said jacket being contained substantially entirely within the surface of said aircraft.

6. In combination with an aircraft, a receptacle having a perforate side and imperforate other sides, said perforate side being composed of a surface portion of said aircraft, a muffler in said receptacle, a compartment sealed, spaced from, and partially enclosing said receptacle, said compartment having a perforate wall and imperforate other walls, said perforate wall of said compartment forming a part of the surface of said aircraft which lies between said perforate side of said receptacle and the adjacent surfaces of said aircraft, and means to circulate a cooling medium through said chamber.

7. In the combination of claim 6, said perforate side of said compartment comprising a surface portion of said aircraft surrounding said perforate side of said receptacle.

HERMAN G. KLEMM.
BERTHOUD C. BOULTON.